(12) United States Patent
Tsaur et al.

(10) Patent No.: US 8,995,665 B1
(45) Date of Patent: Mar. 31, 2015

(54) ROLE BASED ENCRYPTION WITHOUT KEY MANAGEMENT SYSTEM

(75) Inventors: Ynn-Pyng "Anker" Tsaur, Oviedo, FL (US); William Troy Cochran, Orlando, FL (US)

(73) Assignee: Symantec Corporation, Mountain View, CA (US)

( * ) Notice: Subject to any disclaimer, the term of this patent is extended or adjusted under 35 U.S.C. 154(b) by 1146 days.

(21) Appl. No.: 12/195,370

(22) Filed: Aug. 20, 2008

(51) Int. Cl.
*H04L 9/08* (2006.01)
*H04L 9/30* (2006.01)

(52) U.S. Cl.
CPC .................. *H04L 9/0822* (2013.01)
USPC ....................................................... 380/277

(58) Field of Classification Search
CPC .................................. H04L 9/08; H04L 9/30
USPC ....................................................... 380/277
See application file for complete search history.

(56) References Cited

U.S. PATENT DOCUMENTS

| | | | |
|---|---|---|---|
| 6,925,182 B1 * | 8/2005 | Epstein ........................ | 380/277 |
| 6,931,133 B2 * | 8/2005 | Andrews et al. .............. | 380/286 |
| 2007/0219915 A1 * | 9/2007 | Hatano et al. ................. | 705/57 |
| 2007/0258623 A1 * | 11/2007 | McGrath et al. .............. | 382/104 |
| 2010/0104101 A1 * | 4/2010 | Dickinson et al. ............ | 380/277 |

OTHER PUBLICATIONS

PGP® Command Line 9.0—Technology Overview; PGP® White Paper; Oct. 2005.
B. Wilson and J. Reavis; An IT Briefing produced by SearchSecurity.com; PGP Education Series: Staying Out of the Headlines: Strategies for Protecting Critica Data Transfers & Backups; 2005.

* cited by examiner

*Primary Examiner* — Michael Chao
*Assistant Examiner* — Shiuh-Huei Ku
(74) *Attorney, Agent, or Firm* — Brill Law Office; Jeffrey Brill

(57) ABSTRACT

A role based security infrastructure for data encryption that does not require a key management system is provided. For each defined role, a unique key pair is generated. To encrypt a data set, a random encryption key is generated on the fly, and used to encrypt the data. To allow a role access to an encrypted data set, the corresponding encryption key is encrypted with the public key of that role, and stored in association with the encrypted data set. To access an encrypted data set, a private key associated with a role allowed access is used to decrypt the copy of the associated encryption key, which has been encrypted using the corresponding public key and stored in association with the data set. The decrypted encryption key is then used to decrypt the encrypted data set.

20 Claims, 4 Drawing Sheets

ROLE BASED ENCRYPTION WITHOUT KEY MANAGEMENT SYSTEM

TECHNICAL FIELD

This invention pertains generally to key based encryption, and more specifically to enabling role based encryption without the overhead of a key management system.

BACKGROUND

Under role based security systems, different roles are defined for various functions within an organization. The permissions to perform given operations are assigned to specific roles, as opposed to individual users. Users are assigned particular roles, and through those role assignments acquire the permissions to perform particular system functions. Since users are not assigned permissions directly, but only through their role(s), managing user rights becomes a matter of assigning the appropriate roles to the user, which simplifies common operations such as adding a user, or changing a user's department. Role based authentication system with access controlled file-systems exist today, such as Microsoft Windows® security in combination with NTFS, and UNIX® security in combination with UNIX® file-system.

Role based security infrastructure enables multiple users with the same role to access encrypted data on shared storage in enterprise and distributed environments. The traditional implementation approach for this scenario is to employ a dedicated key management system. However, key management systems are difficult to protect and maintain. It would be desirable to enable role based encryption without the overhead of a key management system.

SUMMARY

A role based security infrastructure for data encryption that does not require a key management system is provided. For each defined role, a unique key pair is generated. Each unique key pair comprises a public key and a corresponding private key. To encrypt a data set, a random encryption key is generated on the fly, and used to encrypt the data. To allow a role access to an encrypted data set, the corresponding encryption key is encrypted with the public key of that role, and stored in association with the encrypted data set. To access an encrypted data set, a private key associated with a role allowed access is used to decrypt the copy of the associated encryption key, which has been encrypted using the corresponding public key and stored in association with the data set. The decrypted encryption key is then used to decrypt the encrypted data set. Using this functionality, key replacement, key addition, key revocation and key recovery are all possible as well.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
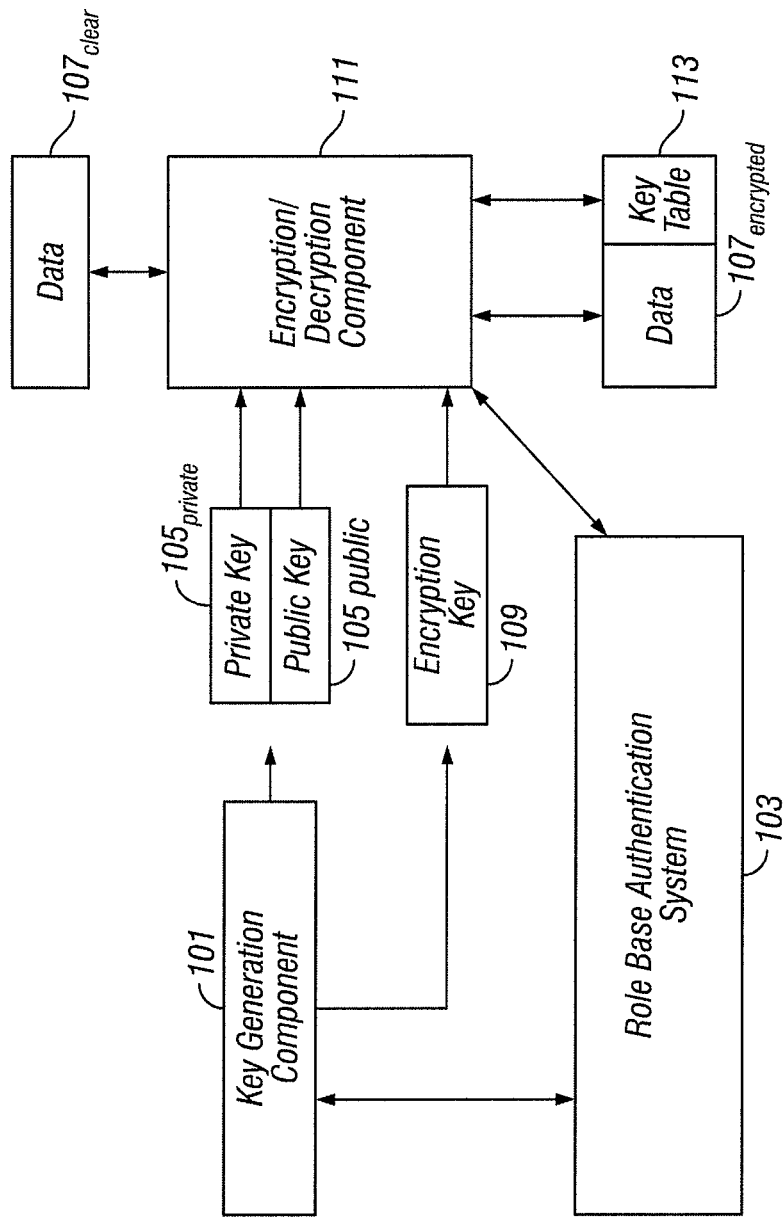
FIG. 1 is a block diagram illustrating enabling role based encryption without requiring a key management system, according to some embodiments of the present invention.

FIG. 1 illustrates enabling role based encryption without requiring a key management system, according to some embodiments of the present invention. It is to be understood that although various components are illustrated and described above as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a key generation component 101 runs in conjunction with a role based authentication system 103 (e.g., Microsoft Windows® and NTFS). The present invention is not limited to the use of any particular role based authentication system 103. The key generation component 101 generates a unique public/private key pair 105 for each defined role. In order to generate a key pair 105, the key generation component 101 can use either deterministic or non-deterministic random number generation (DRNG or NDRNG) as a seed. DRNG, which is derived from a known secret such as a password or challenge, can be used to generate a consistent key pair 105 from the same secret or challenge. For each generated key pair 105, the public key $105_{public}$ is made generally accessible, whereas the role based authentication system 103 is used to made the private key $105_{private}$ accessible only to users assigned to the defined role.

Each time data $107_{clear}$ is to be encrypted, the key generation component 101 randomly generates an encryption key 109 on the fly, typically using non-deterministic random number generation. The encryption/decryption component 111 uses the data encryption key 109 to encrypt the data 107. The encryption/decryption component 111 encrypts the encryption key 109 using the public key $105_{public}$ associated with each role which is allowed to access the encrypted data $107_{encrypted}$. The resulting encrypted data key(s) 109 are stored in association with the encrypted data $107_{encrypted}$ itself, for example in an encryption key table 113 or the like.

In order to decrypt data 107, a user can access the private key $105_{private}$ associated with any role he belongs to, and, using that private key $105_{private}$, call the encryption/decryption component 111 to decrypt the data set $107_{encrypted}$. The encryption/decryption component 111 can decrypt the appropriate encryption key 109 using the private key $105_{private}$ associated with the role. The encryption/decryption component 111 can then decrypt the encrypted data $107_{encrypted}$ using the encryption key 109, which it decrypted using the private key $105_{private}$ associated with the role.

Using the above described functionality, key replacement, key addition, key revocation and key recovery are all possible. In one embodiment, for each encrypted data set $107_{encrypted}$, at least one key pair 105 associated with at least one role having access to that encrypted data set $107_{encrypted}$ is derived using DRNG. This is so for disaster recovery purposes. More specifically, in a disaster recovery situation, where at least one key pair 105 has been generated using DRNG methodology, that key pair 105 can be regenerated using the known secret of the associated role. Using the key revocation and key addition processes described below, access to encrypted data files 107 for other roles can then be granted again.

Figure 2:
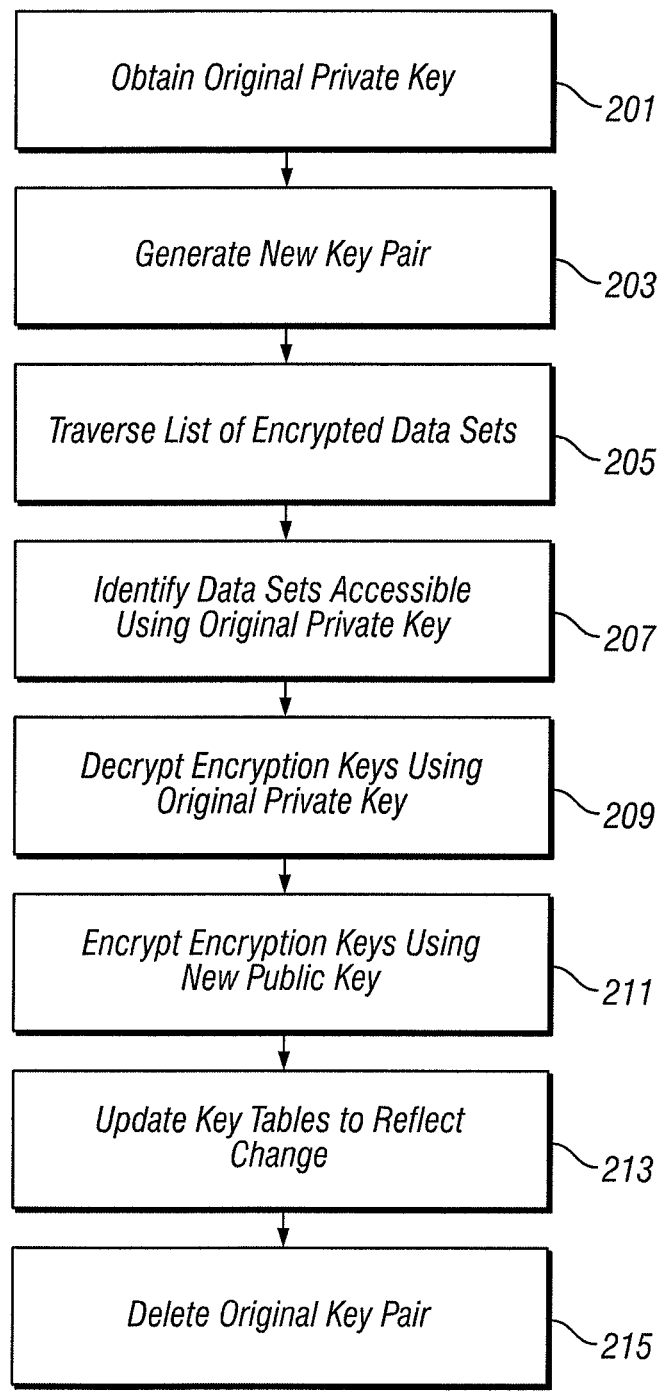
FIG. 2 is a flowchart illustrating steps for a key replacement process, according to some embodiments of the present invention.

FIG. 2 is a flowchart illustrating a key replacement process according to one embodiment of the present invention. It can be desirable to change a key pair 105 associated with a role, for example if a password is changed. To do so, the original private key 105 private associated with the role is obtained 201, and a new key pair 105 is generated 203 using DRNG or NDRNG as desired. A list of all encrypted data sets $107_{encrypted}$ is traversed 205, and the encryption key table 113 associated with each encrypted data set $107_{encrypted}$ is scanned 207 to identify each instance in which an encrypted data set $107_{encrypted}$ is accessible by using the private key $105_{private}$ of the key pair 105 to be replaced. For each identified instance, the data encryption key 109 encrypted with the original public key $105_{public}$ is decrypted 209, using the original private key $105_{private}$. The data encryption key 109 is then encrypted 211 using the new public key $105_{public}$, and the encryption key table 113 is updated 213 to delete the old encrypted data encryption key 109 and add the new one. The original key pair 105 is then deleted 215.

Figure 3:
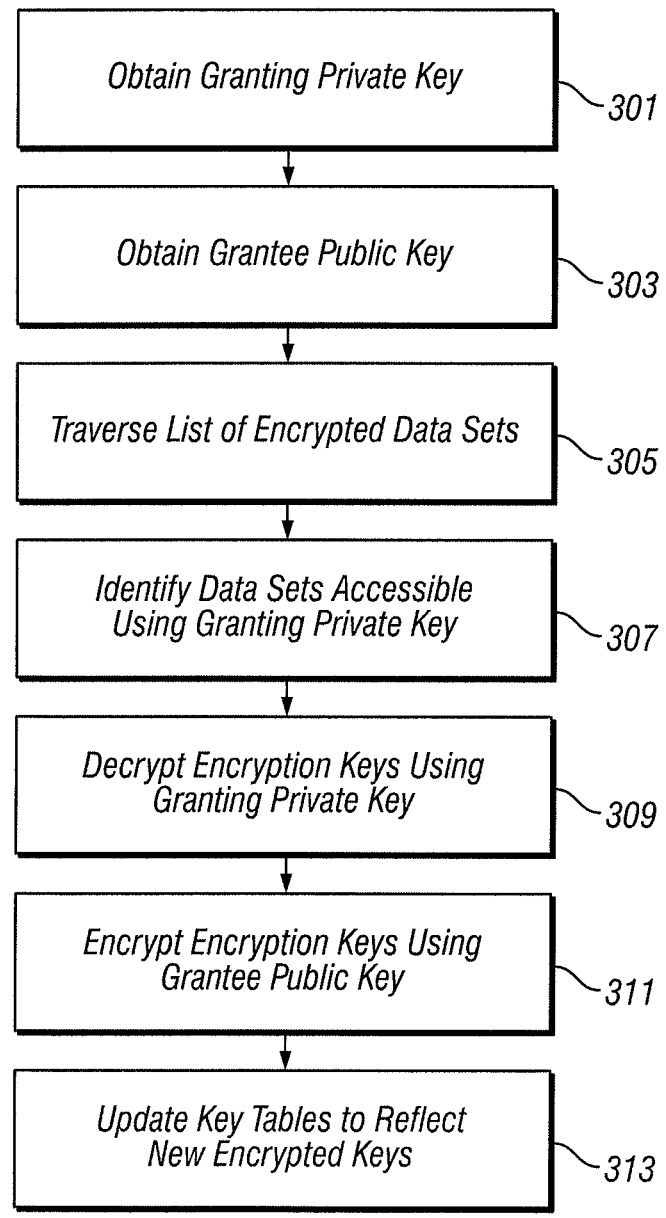
FIG. 3 is a flowchart illustrating steps for a key addition process, according to some embodiments of the present invention.

FIG. 3 illustrates steps for a key addition process (e.g., for granting a new role access to existing encrypted data $107_{encrypted}$), according to one embodiment of the present invention. The original private key $105_{private}$ associated with the role that is granting access to the new role is obtained 301. The public key $105_{public}$ associated with the role being granted access is obtained 303 as well. A list of all encrypted data sets $107_{encrypted}$ is traversed 305, and the encryption key table 113 associated with each encrypted data set $107_{encrypted}$ is scanned 307 to identify each instance in which an encrypted data set $107_{encrypted}$ is accessible by using the private key $105_{private}$ associated with the granting role. For each identified data set $107_{encrypted}$, the data encryption key 109 encrypted with the granting role's public key $105_{public}$ is decrypted 309 using the granting role's private key $105_{private}$. The data encryption key 109 is then encrypted 311 using public key $105_{public}$ associated with the newly granted role, and added 313 to the encryption key table 113.

Figure 4:
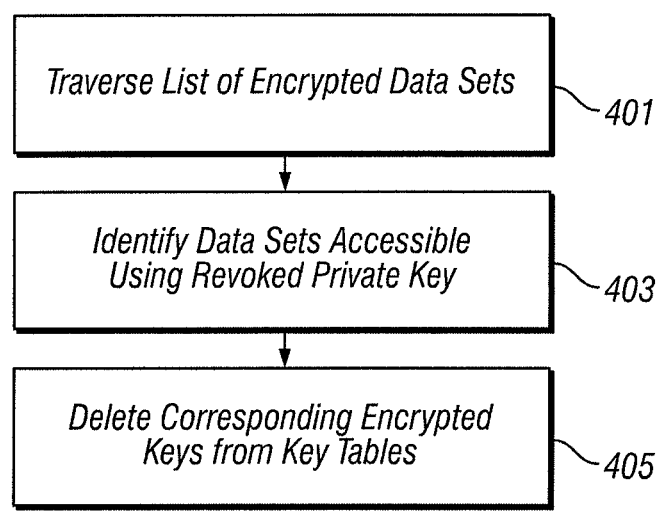
FIG. 4 is a flowchart illustrating steps for a key revocation process, according to some embodiments of the present invention.

Finally, FIG. 4 illustrates steps for a key revocation process (to be performed, e.g., when a role's access is changed) according to one embodiment of the present invention. A list of all encrypted data sets $107_{encrypted}$ is traversed 401, and the encryption key table 113 associated with each encrypted data set $107_{encrypted}$ is scanned 403 to identify each instance in which an encrypted data set $107_{encrypted}$ is accessible by using the private key $105_{private}$ to be revoked. For each identified data set $107_{encrypted}$, the data encryption key 109 encrypted with the corresponding public key $105_{public}$ is deleted 405 from the encryption key table 113.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A computer implemented method for providing role based encryption within a role based authentication context, without the use of a key management system, the method comprising the steps of:
   generating, by a computer, a unique key pair for each of a plurality of defined roles within the role based authentication context including generating at least one unique key pair using deterministic random number generation derived from a known secret to generate a consistent unique key pair from the same known secret, each said unique key pair comprising a public key and a corresponding private key, each defined role associated with one or more functions of an entity and one or more users of the entity; and
   encrypting, by a computer, at least one data set by performing at least the following steps:
      generating a random encryption key on the fly;
      encrypting the data set with the generated encryption key; and
      for at least one role allowed to access the encrypted data set, encrypting the encryption key with the public key associated with that role and storing the encrypted encryption key in association with the encrypted data set.

2. The method of claim 1 wherein generating a unique key pair for each of a plurality of defined roles further comprises performing at least one step from a group of steps consisting of:
   generating at least one unique key pair using deterministic random number generation; and
   generating at least one unique key pair using non-deterministic random number generation.

3. The method of claim 1 wherein encrypting the encryption key with a public key associated with at least one role allowed to access the encrypted data set further comprises:

for each role allowed to access the encrypted data set, encrypting the encryption key with the public key associated with that role.

4. The method of claim 1 further comprising decrypting a data set by performing at least the following steps:
   using a private key associated with a role allowed to access a data set to decrypt a copy of the associated encryption key, the copy of the encryption key having been encrypted using the corresponding public key and stored in association with the data set; and
   using the decrypted encryption key to decrypt the encrypted data set.

5. The method of claim 1 further comprising replacing a key pair associated with a role by performing at least the following steps:
   generating a new key pair associated with the role;
   for each encrypted data set that has a copy of an encryption key encrypted using the public key being replaced stored in association therewith: decrypting the encrypted copy of the encryption key using the private key being replaced; encrypting the encryption key using the new public key; and updating storage in association with that encrypted data set to delete the copy of the encryption key encrypted with the public key being replaced and add the copy of the encryption key encrypted with the new public key; and
   deleting the key pair being replaced.

6. The method of claim 1 further comprising a first role granting a second role access to at least one data set by performing at least the following steps:
   for each encrypted data set that has a copy of an encryption key encrypted using the public key of the first role stored in association therewith: decrypting the encrypted copy of the encryption key using the private key of the first role; encrypting the encryption key using the public key of the second role; and updating storage in association with that encrypted data set to add the copy of the encryption key encrypted with the public key of the second role.

7. The method of claim 1 further comprising revoking a key pair associated with a role by performing at least the following steps:
   for each encrypted data set that has a copy of an encryption key encrypted using the public key being revoked stored in association therewith, updating storage in association with that encrypted data set to delete the copy of the encryption key encrypted with the public key being revoked.

8. The method of claim 1 further comprising:
   for each encrypted data set, generating at least one key pair associated with at least one role having access to that encrypted data set using deterministic random number generation.

9. The method of claim 8 further comprising:
   responsive to loss of at least one private key associated with a role having access to a data set, regenerating a key pair associated with a role having access to that data set, using a known secret associated with that role.

10. At least one non-transitory computer readable medium containing a computer program product for providing role based encryption within a role based authentication context, without the use of a key management system, the computer program product comprising:
    program code for generating a unique key pair for each of a plurality of defined roles within the role based authentication context including generating at least one unique key pair using deterministic random number generation derived from a known secret to generate a consistent unique key pair from the same known secret, each said unique key pair comprising a public key and a corresponding private key, each defined role associated with one or more functions of an entity and one or more users of the entity; and
    program code for encrypting at least one data set by performing at least the following steps:
       generating a random encryption key on the fly;
       encrypting the data set with the generated encryption key; and
       program code for, for at least one role allowed to access the encrypted data set, encrypting the encryption key with the public key associated with that role and storing the encrypted encryption key in association with the encrypted data set.

11. The computer program product of claim 10 wherein the program code for generating a unique key pair for each of a plurality of defined roles further comprises program code for performing at least one step from a group of steps consisting of:
    generating at least one unique key pair using deterministic random number generation; and
    generating at least one unique key pair using non-deterministic random number generation.

12. The computer program product of claim 10 wherein the program code for encrypting the encryption key with a public key associated with at least one role allowed to access the encrypted data set further comprises program code for:
    for each role allowed to access the encrypted data set, encrypting the encryption key with the public key associated with that role.

13. The computer program product of claim 10 further comprising program code for decrypting a data set by performing at least the following steps:
    using a private key associated with a role allowed to access a data set to decrypt a copy of the associated encryption key, the copy of the encryption key having been encrypted using the corresponding public key and stored in association with the data set; and
    using the decrypted encryption key to decrypt the encrypted data set.

14. The computer program product of claim 10 further comprising program code for replacing a key pair associated with a role by performing at least the following steps:
    generating a new key pair associated with the role;
    for each encrypted data set that has a copy of an encryption key encrypted using the public key being replaced stored in association therewith: decrypting the encrypted copy of the encryption key using the private key being replaced; encrypting the encryption key using the new public key; and updating storage in association with that encrypted data set to delete the copy of the encryption key encrypted with the public key being replaced and add the copy of the encryption key encrypted with the new public key; and
    deleting the key pair being replaced.

15. The computer program product of claim 10 further comprising program code for a first role granting a second role access to at least one data set by performing at least the following steps:
    for each encrypted data set that has a copy of an encryption key encrypted using the public key of the first role stored in association therewith: decrypting the encrypted copy of the encryption key using the private key of the first role; encrypting the encryption key using the public key of the second role; and updating storage in association with that encrypted data set to add the copy of the encryption key encrypted with the public key of the second role.

16. The computer program product of claim 10 further comprising program code for revoking a key pair associated with a role by performing at least the following steps:

for each encrypted data set that has a copy of an encryption key encrypted using the public key being revoked stored in association therewith, updating storage in association with that encrypted data set to delete the copy of the encryption key encrypted with the public key being revoked.

17. The computer program product of claim 10 further comprising:

program code for, for each encrypted data set, generating at least one key pair associated with at least one role having access to that encrypted data set using deterministic random number generation.

18. The computer program product of claim 17 further comprising:

program code for, responsive to loss of at least one private key associated with a role having access to a data set, regenerating a key pair associated with a role having access to that data set, using a known secret associated with that role.

19. A computer system for providing role based encryption within a role based authentication context, without the use of a key management system, the computer system comprising:

a computer memory;

a key generation component residing in the computer memory, the key generation component being configured for generating a unique key pair for each of a plurality of defined roles within the role based authentication context including generating at least one unique key pair using deterministic random number generation derived from a known secret to generate a consistent unique key pair from the same known secret, each said unique key pair comprising a public key and a corresponding private key, each defined role associated with one or more functions of an entity and one or more users of the entity; and an encryption/decryption component, residing in the computer memory, the encryption/decryption component being configured for encrypting at least one data set by performing at least the following steps:

generating a random encryption key on the fly;

encrypting the data set with the generated encryption key; and for at least one role allowed to access the encrypted data set, encrypting the encryption key with the public key associated with that role and storing the encrypted encryption key in association with the encrypted data set.

20. The computer system of claim 19 further comprising wherein the encryption/decryption component is further configured for decrypting a data set by performing at least the following steps:

using a private key associated with a role allowed to access a data set to decrypt a copy of the associated encryption key, the copy of the encryption key having been encrypted using the corresponding public key and stored in association with the data set; and using the decrypted encryption key to decrypt the encrypted data set.

* * * * *